United States Patent
Yanase et al.

(10) Patent No.: US 7,720,934 B2
(45) Date of Patent: May 18, 2010

(54) ELECTRONIC MUSICAL APPARATUS, MUSIC CONTENTS DISTRIBUTING SITE, MUSIC CONTENTS PROCESSING METHOD, MUSIC CONTENTS DISTRIBUTING METHOD, MUSIC CONTENTS PROCESSING PROGRAM, AND MUSIC CONTENTS DISTRIBUTING PROGRAM

(75) Inventors: Tsutomu Yanase, Hamamatsu (JP); Satoru Umezawa, Kakegawa (JP)

(73) Assignee: Yamaha Corporation (JP)

( * ) Notice: Subject to any disclaimer, the term of this patent is extended or adjusted under 35 U.S.C. 154(b) by 948 days.

(21) Appl. No.: 11/019,086

(22) Filed: Dec. 21, 2004

(65) Prior Publication Data

US 2005/0195695 A1 Sep. 8, 2005

(30) Foreign Application Priority Data

Dec. 26, 2003 (JP) ............................. 2003-432350

(51) Int. Cl.
- G06F 15/16 (2006.01)
- G06F 15/177 (2006.01)
- G06F 21/00 (2006.01)
- G06F 7/04 (2006.01)

(52) U.S. Cl. ..................... 709/219; 709/217; 713/176; 705/52

(58) Field of Classification Search ................. 709/219, 709/217, 220, 221, 222, 228; 369/30.06; 713/176, 182; 726/26; 705/82; 380/2
See application file for complete search history.

(56) References Cited

U.S. PATENT DOCUMENTS

| | | | |
|---|---|---|---|
| 6,389,403 B1 * | 5/2002 | Dorak, Jr. .................... 705/52 |
| 6,389,538 B1 * | 5/2002 | Gruse et al. .................. 713/194 |
| 6,515,211 B2 | 2/2003 | Umezawa et al. | |
| 6,563,770 B1 * | 5/2003 | Kokhab .................... 369/30.08 |
| 6,570,080 B1 | 5/2003 | Hasegawa et al. | |
| 6,574,609 B1 * | 6/2003 | Downs et al. .................. 705/50 |

(Continued)

FOREIGN PATENT DOCUMENTS

| | | |
|---|---|---|
| EP | 1 403 847 A2 | 3/2004 |
| JP | 2001-42866 A | 2/2001 |
| JP | 2002-335507 A | 11/2002 |
| JP | 2002-341876 A | 11/2002 |
| JP | 2002-369174 A | 12/2002 |

(Continued)

OTHER PUBLICATIONS

Relevant portion of European Search Report dated Apr. 10, 2006 of European Application EP 05 10 7121 which corresponds to a related application.

(Continued)

Primary Examiner—William C Vaughn, Jr.
Assistant Examiner—Muktesh G Gupta
(74) Attorney, Agent, or Firm—Rossi, Kimms & McDowell LLP

(57) ABSTRACT

An electronic musical apparatus for use in a music contents distribution processing system which makes it possible to selectively use usage modes such as downloading of music contents from a music contents distributing site to a user terminal (electronic musical apparatus) and streaming of such music contents in a simple manner. A distribution mode designating file indicative of whether music contents are to be distributed from the music contents distributing site in a download mode or a streaming mode is received and interpreted. The music contents received from the music contents distributing site are processed in the download mode or the streaming mode according to the result of the interpretation.

12 Claims, 5 Drawing Sheets

U.S. PATENT DOCUMENTS

| | | | |
|---|---|---|---|
| 6,587,837 B1* | 7/2003 | Spagna et al. | 705/26 |
| 6,660,922 B1 | 12/2003 | Roeder | |
| 6,671,807 B1 | 12/2003 | Jaisimha et al. | |
| 6,771,568 B2* | 8/2004 | Hochendoner | 369/30.06 |
| 6,983,371 B1* | 1/2006 | Hurtado et al. | 713/189 |
| 7,019,204 B2 | 3/2006 | Terada | |
| 7,032,819 B2 | 4/2006 | Iida et al. | |
| 7,069,274 B2* | 6/2006 | Stern | 707/104.1 |
| 7,113,983 B1 | 9/2006 | Terada et al. | |
| 7,159,174 B2* | 1/2007 | Johnson et al. | 715/716 |
| 7,206,821 B2* | 4/2007 | Moritomo | 709/217 |
| 7,209,900 B2* | 4/2007 | Hunter et al. | 705/58 |
| 7,216,178 B2* | 5/2007 | Juszkiewicz | 709/231 |
| 7,277,928 B2* | 10/2007 | Lennon | 709/219 |
| 7,281,034 B1* | 10/2007 | Eyal | 709/219 |
| 7,356,557 B2 | 4/2008 | Kikuchi et al. | |
| 7,371,956 B2 | 5/2008 | Tohgi et al. | |
| 7,415,439 B2* | 8/2008 | Kontio et al. | 705/53 |
| 2001/0049641 A1 | 12/2001 | Nakamura et al. | |
| 2002/0053078 A1* | 5/2002 | Holtz et al. | 725/14 |
| 2002/0065880 A1 | 5/2002 | Hasegawa et al. | |
| 2002/0103759 A1 | 8/2002 | Matsumoto et al. | |
| 2002/0165921 A1 | 11/2002 | Sapieyevski | |
| 2003/0029304 A1 | 2/2003 | Ochi | |
| 2003/0110503 A1* | 6/2003 | Perkes | 725/86 |
| 2003/0200316 A1 | 10/2003 | Isozaki et al. | |
| 2004/0019900 A1* | 1/2004 | Knightbridge et al. | 725/23 |
| 2004/0139845 A1 | 7/2004 | Tohgi et al. | |
| 2005/0150358 A1 | 7/2005 | Yanase et al. | |
| 2005/0188823 A1 | 9/2005 | Okamoto | |
| 2005/0195695 A1 | 9/2005 | Yanase et al. | |
| 2006/0027077 A1 | 2/2006 | Ikeda et al. | |
| 2006/0031548 A1 | 2/2006 | Funchess | |
| 2006/0031785 A1 | 2/2006 | Raciborski | |
| 2006/0054008 A1 | 3/2006 | Yanese et al. | |
| 2007/0012164 A1 | 1/2007 | Morley et al. | |

FOREIGN PATENT DOCUMENTS

| | | |
|---|---|---|
| JP | 2003-114690 A | 4/2003 |
| JP | 2003-308237 A | 10/2003 |
| WO | 03/096340 A2 | 11/2003 |

OTHER PUBLICATIONS

Kozamernik, Franc; "Streaming Media over the Internet? An Overview of Delivery Technologies"; EBU Technical Review; [Online] Oct. 2002; Retrieved from the Internet: http://www.ebu.ch/en/technical/trev/trev_292-kozamernik.pdf.

Lowry, Michael A.; "Hacker's Guide to QuickTime"; [Online] Mar. 1, 2004; Retrieved from the Internet: http://web.archive.org/web/20040301042747/http://home.sol.se/michael/qtguide/.

Anonymous; "How to Protect Streaming Video/Audio from Recording?"; [Online] Jun. 18, 2004; Retrieved from the Internet: http://web.archive.org/web/20040618041518/http://www.all-streaming-media.com/streaming-media-faq/faq-protect-streaming-video.htm.

Relevant portion of European Search Report dated Jan. 30, 2006 of European Application EP 05 10 7121 which corresponds to a related application.

Nilsson, M.; "ID3 Tag version 2.4.0—Native Frames"; Nov. 1, 2000; retrieved from the Internet on Nov. 24, 2005.

Microsoft Corp.: "Windows Media Player 9 Series Help File"; Jun. 7, 2003; XP002356255. Online at:http://web.archive.org/web/20030607004710/microsoft.com/windows/windowsmedia/9series/player/helpdocs.aspx; Retrieved on Nov. 24, 2005; pp. 1-14, 30-33, 70-77, 89-90 and 158.

Yamaha Corp.; "Digital Music Notebook Help Version 1.02"; CD-Rom 2003, XP002356256. Retrieved on Apr. 6, 2005.

English translation of an office action issued in corresponding Japanese patent application No:2003-432350, mailed Dec. 4, 2007.

Relevant portion of Search Report issued in a corresponding European application, dated Oct. 25, 2005; 3 pgs.

Anonymous: "The HFA website provides answers to commonly asked questions about mechanical licensing and other related inquiries;" HFA, Online! XP002348047 Retrieved from the internet: URL:http://www.harryfox.com/public/infoFAQDefinitions.jsp>.

Buechner, M., "Too Legit For those who want to stay within the laws, the variety on download sites is getting better all the time;" Internet Article, Online! Apr. 7, 2003; XP002348046, Retrieved from the Internet: URL;http://www.time.com/time/techtime/200304/sites_angel.html> retrieved on Oct. 6, 2005.

Office Action dated Mar. 18, 2009, issued in Japanese Application No. 2004-227803, which corresponds to related co-pending U.S. Appl. No. 11/195,062. Partial English translation provided.

Japanese Office Action issued in the divisional application No. 2008-015813; mailed Aug. 4, 2009; of which the base Japanese patent application, from which the instant U.S. application claims priority. (English Translation).

* cited by examiner

ELECTRONIC MUSICAL APPARATUS, MUSIC CONTENTS DISTRIBUTING SITE, MUSIC CONTENTS PROCESSING METHOD, MUSIC CONTENTS DISTRIBUTING METHOD, MUSIC CONTENTS PROCESSING PROGRAM, AND MUSIC CONTENTS DISTRIBUTING PROGRAM

BACKGROUND OF THE INVENTION

1. Field of the Invention

The present invention relates to a music contents distribution processing system which is capable of selectively using music contents usage modes in a simple manner, and more particularly to an electronic musical apparatus, a music contents distributing site, a music contents processing method, a music contents distributing method, a music contents processing program, and a music contents distributing program, for use in the contents distribution processing system.

2. Description of the Related Art

Conventionally, as disclosed in e.g. Japanese Patent Publication No. 3262121, there has been known a system in which music contents are distributed from a server (contents distributing site) to user terminals via a network so that the music contents can be previewed and downloaded.

In this conventional system, it is complicated to control downloading and preview. For example, in the case where an electronic musical apparatus is used as a user terminal, it is necessary to provide different kinds of control; i.e. to download music contents, the music contents distributed from a contents distributing site are stored in a predetermined recording medium, and to preview music contents, they are reproduced by streaming in real time and temporarily stored in a temporary memory without being stored in a recording medium. However, if the contents distributing site is caused to provide these kinds of control, very complicated processing is required.

SUMMARY OF THE INVENTION

It is an object of the present invention to provide an electronic musical apparatus, a music contents distributing site, a music contents processing method, a music contents distributing method, a music contents processing program, and a music contents distributing program, for use in a music contents distribution processing system, which make it possible to selectively use usage modes such as downloading of music contents from a music contents distributing site to a user terminal (electronic musical apparatus) and streaming of such music contents in a simple manner.

To attain the above object, in a first aspect of the present invention, there is provided an electronic musical apparatus comprising a distribution mode receiving device that receives a distribution mode designating file indicative of whether music contents are to be distributed from a music contents distributing site in a download mode or a streaming mode, a distribution mode interpreting device that interprets the received distribution mode designating file, a contents receiving device that receives the music contents from the music contents distributing site, and a contents processing device that performs processing on the received music contents in the download mode or the streaming mode according to a result of the interpretation by the distribution mode interpreting device.

Preferably, the electronic musical apparatus further comprises a storage device comprising at least a first storage medium and a second storage medium, and in the download mode, the contents processing device permanently stores the music contents received by the contents receiving device in the first storage medium, and in the streaming mode, the contents processing device temporarily stores the music contents received by the contents receiving device in the second storage medium, and automatically starts reproducing the stored music contents.

More preferably, the music contents comprise a plurality of contents including at least download contents and preview contents, each including a plurality of types of data including at least song data and style data, and the contents receiving device receives the download contents in the download mode, and receives one of the download contents and the preview contents in the streaming mode.

Further preferably, the first storage medium comprises a plurality of storage areas, and the contents processing device stores the download contents in respective ones of the storage areas corresponding to the types of the download contents.

Also more preferably in the download mode, the contents processing device temporarily stores the music contents received by the contents receiving device in the first storage medium, but never automatically reproduces the music contents stored in the first storage medium.

To attain the above object, in a second aspect of the present invention, there is provided a music contents distributing site comprising a usage instruction receiving device that receives an instruction indicative of a music contents usage mode from a user terminal, a distribution mode sending device that sends a distribution mode designating file indicative of whether processing on music contents to be distributed is to be performed in a download mode or a streaming mode to the user terminal according to contents of the received instruction, and a contents sending device that sends the music contents to the user terminal according to a request to distribute the music contents, which is sent from the user terminal.

Preferably, the music contents distributing site further comprises a charging device that carries out a charging process according to the instruction indicative of the music contents usage mode received by the usage instruction receiving device, and the distribution mode sending device sends the distribution mode designating file after the charging process is carried out by the charging device.

More preferably, the music contents comprise a plurality of contents including at least download contents and preview contents, each including a plurality of types of data including at least song data and style data, and when the distribution mode designating file designates processing in the download mode, the contents sending device sends the download contents, and when the distribution mode designating file designates processing in the streaming mode, the contents sending device sends one of the download contents and the preview contents.

To attain the above object, in a third aspect of the present invention, there is provided a music contents processing method comprising a distribution mode receiving step of receiving a distribution mode designating file indicative of whether music contents are to be distributed from a music contents distributing site in a download mode or a streaming mode, a distribution mode interpreting step of interpreting the received distribution mode designating file, a contents receiving step of receiving the music contents from the music contents distributing site, and a contents processing step of performing processing on the received music contents in the download mode or the streaming mode according to a result of the interpretation in the distribution mode interpreting step.

To attain the above object, in a fourth aspect of the present invention, there is provided a music contents distributing method comprising a usage instruction receiving step of receiving an instruction indicative of a music contents usage mode from a user terminal, a distribution mode sending step of sending a distribution mode designating file indicative of whether processing on music contents to be distributed is to be performed in a download mode or a streaming mode to the user terminal according to contents of the received instruction, and a contents sending step of sending the music contents to the user terminal according to a request to distribute the music contents, which is sent from the user terminal.

To attain the above object, in a fifth aspect of the present invention, there is provided a music contents processing program executed by a computer, comprising a distribution mode receiving module for receiving a distribution mode designating file indicative of whether music contents are to be distributed from a music contents distributing site in a download mode or a streaming mode, a distribution mode interpreting module for interpreting the received distribution mode designating file, a contents receiving module for receiving the music contents from the music contents distributing site, and a contents processing module for performing processing on the received music contents in the download mode or the streaming mode according to a result of the interpretation by the distribution mode interpreting module.

To attain the above object, in a sixth aspect of the present invention, there is provided a music contents distributing program executed by a computer, comprising a usage instruction receiving module for receiving an instruction indicative of a music contents usage mode from a user terminal, a distribution mode sending module for sending a distribution mode designating file indicative of whether music contents to be distributed are to be processed in a download mode or a streaming mode to the user terminal according to contents of the received instruction, and a contents sending module for sending the music contents to the user terminal according to a request to distribute the music contents, which is sent from the user terminal.

According to the first aspect of the present invention, in the music contents distribution processing system, the electronic musical apparatus (EM) as a user terminal accesses the distributing site (DS) via a communication network (CN) such as the Internet and designates a music contents usage mode (step S1), the distributing site (DS) returns a distribution mode designating file (DF) corresponding to the designated usage mode (step S23). The file (DF) is indicative of whether processing on music contents (CF) to be distributed is to be performed in the download mode or the streaming mode in accordance with the usage mode designated by the electronic musical apparatus (EM). In the electronic musical apparatus (EM), the file (DF) is interpreted (step S11), and according to the interpretation result, processing on music contents (CF) sent from the distributing site (DS) in response to a request to distribute the music contents (CF) is performed in the download mode or the streaming mode to carry out downloading, streaming-reproduction, or the like (step S12)

As stated above, in distributing music contents, first, a distribution mode designating file (DF) is downloaded from the music contents distributing site (DS) to the electronic musical apparatus (EM) via the communication network (CN). In the electronic musical apparatus (EM), the distribution mode designating file (DF) is interpreted, and music contents (CF) sent from the distributing site (DS) are downloaded or streaming-reproduced according to the interpretation result. Thus, in the music contents distribution processing system, it is possible to selectively use music contents usage modes such as downloading and streaming-reproduction of music contents only by determining a distribution mode designating file (DF) on the distributing site (DS) side without performing any complicated processing.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof. It should be understood, however, that the present invention is not limited to the embodiment described below, but various changes in or to the embodiment described below may be possible without departing from the spirits of the present invention.

Figure 1:
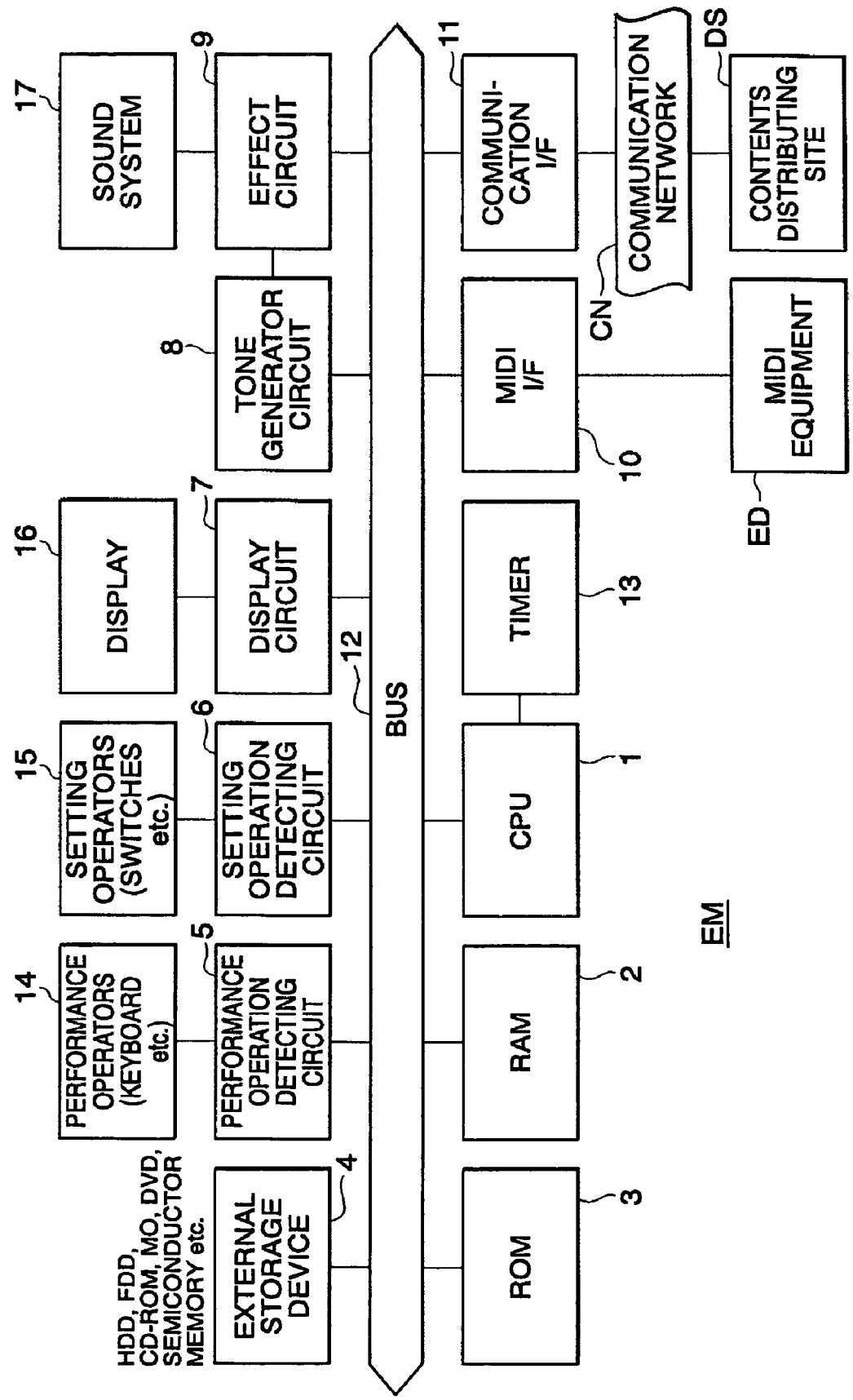
FIG. 1 is a block diagram showing the hardware configuration of a contents distribution processing system which is comprised of an electronic musical apparatus and a contents distributing site according to an embodiment of the present invention.

FIG. 1 is a block diagram showing the hardware configuration of a contents distribution processing system comprised of an electronic musical apparatus and a contents distributing site according to an embodiment of the present invention. In the contents distribution processing system in FIG. 1, an electronic musical apparatus EM which functions as a user terminal is implemented by an electronic musical instrument or a music information processing apparatus such as a personal computer (PC) including a performance operating section and a musical tone output section. As shown in FIG. 1, the electronic musical apparatus EM is comprised of a central processing unit (CPU) 1, a random access memory (RAM) 2, a read only memory (ROM) 3, an external storage device 4, a performance operation detecting circuit 5, a setting operation detecting circuit 6, a display circuit 7, a tone generator circuit 8, an effect circuit 9, a MIDI interface (I/F) 10, a communication interface (I/F) 11, etc. These component elements 1 to 11 are connected to each other via a bus 12.

The CPU 1 executes various kinds of music information processing including music contents processing using clocks generated by a timer 13 according to various control programs including a music contents processing program according to the present embodiment. For example, the music contents processing program includes a browser, and a downloading and reproducing program (DR). That is, in a stage before the distribution of music contents, the CPU 1 functions as a browser processing section (BR) according to the browser to perform browser processing for a contents distributing site (DS). During the distribution of the music contents, the CPU 1 functions as a downloading and reproducing processing section (DR), and in accordance with the downloading and reproducing program, the CPU 1 performs processing on the music contents distributed from the contents distributing site (DS) according to a distribution type (DT) determined depending on the result of communication with the contents distributing site (DS), which is acquired as a result of the browser processing.

The RAM 2 is used as a working area to temporarily store various kinds of data required for the above-mentioned processing. In the ROM 3, various control programs and parameters for use in executing the above-mentioned processing, music information or the like are stored in advance.

The external storage device 4 is implemented by various portable external storage media such as a compact disk read only memory (CD-ROM), a flexible disk (FD), a magneto-optical (MO) disk, a digital versatile disk (DVD), and a small-sized memory card such as a smart medium (registered trademark), as well. as an internal storage medium such as a hard disk (HD). A storage area for use as a temporary memory (TM) which temporarily stores distributed contents and previewed contents is reserved on the internal storage medium (e.g. HD) as the external storage device 4. It should be noted that the storage area for use as the temporary memory (TM) may be reserved on the RAM 2.

Among the internal storage medium and the external storage media which implement the external storage device 4, an arbitrary storage medium is used as a contents recording medium (RM) which stores contents sent from the contents distributing site (DS). The user can arbitrarily choose a contents recording medium (RM) from among the above-mentioned recording media; storage areas (destination) suitable for the types of contents to be stored are set in advance in the contents recording medium (RM).

The performance-operation detecting circuit 5 detects the contents of performance operations performed through performance operators 14 including a keyboard and wheels and outputs performance information corresponding to the detected contents to the main body of the system. The performance operation detecting circuit 5 and the performance operators 14 constitute the performance operating section. The setting operation detecting circuit 6 detects the contents of setting operations performed through setting operators 15 including numeric/cursor keys and panel switches and output setting information corresponding to the detected contents to the main body of the system.

The display circuit 7 drives a display 16 which displays various screens and various indicators (lamps), and controls displaying/lighting operations thereof in accordance with instructions from the CPU 1 to assist the operator in operating the operators 14 and 15 by displaying operations performed through the operators 14 and 15. The display 16 is capable of displaying image data associated with music data.

The tone generator circuit 8 generates musical tone signals corresponding to musical tone data obtained by performing processing on performance information input by the performance operators 14 or music information supplied from a storage means such as the ROM 3 or the external storage device 4. The effect circuit 9 includes an effect-applying DSP and applies predetermined effects to musical tone signals. The sound system 17 connected to the effect circuit 9 is comprised of a D/A converter, an amplifier, a speaker, etc. These component elements 8, 9, and 17 constitute the musical tone output section; musical tones based on musical tone signals to which effects have been applied are generated from the sound system 17.

Other electronic musical instruments (MIDI equipment) ED are connected to the MIDI I/F 10 so that music information can be exchanged between the electronic musical apparatus EM and the electronic musical instruments ED. A communication network CN such as the Internet is connected to the communication I/F 11, so that the electronic musical apparatus EM can use music contents and various control programs and others related to the usage of the music contents, which are distributed from the music contents distributing site DS via the communication I/F 11. Also, the electronic musical apparatus EM can receive other control programs and music information via the communication I/F 11 from other servers, not shown, connected to the communication network CN and store them in the external storage device 4 so that they can be used.

It should be noted that, in the contents distribution processing system, the music contents distributing site DS has functions of a site managing server and is therefore substantially synonymous with a "music contents distributing server". The music contents distributing site DS is substantially identical in hardware configuration with the electronic musical apparatus EM in FIG. 1, and although not illustrated in detail, the music contents distributing site DS does not have to be provided with the performance operating sections 5 and 14, the musical tone output section 8, 9, and 17, the MIDI I/F 10, and so forth.

Figure 2:
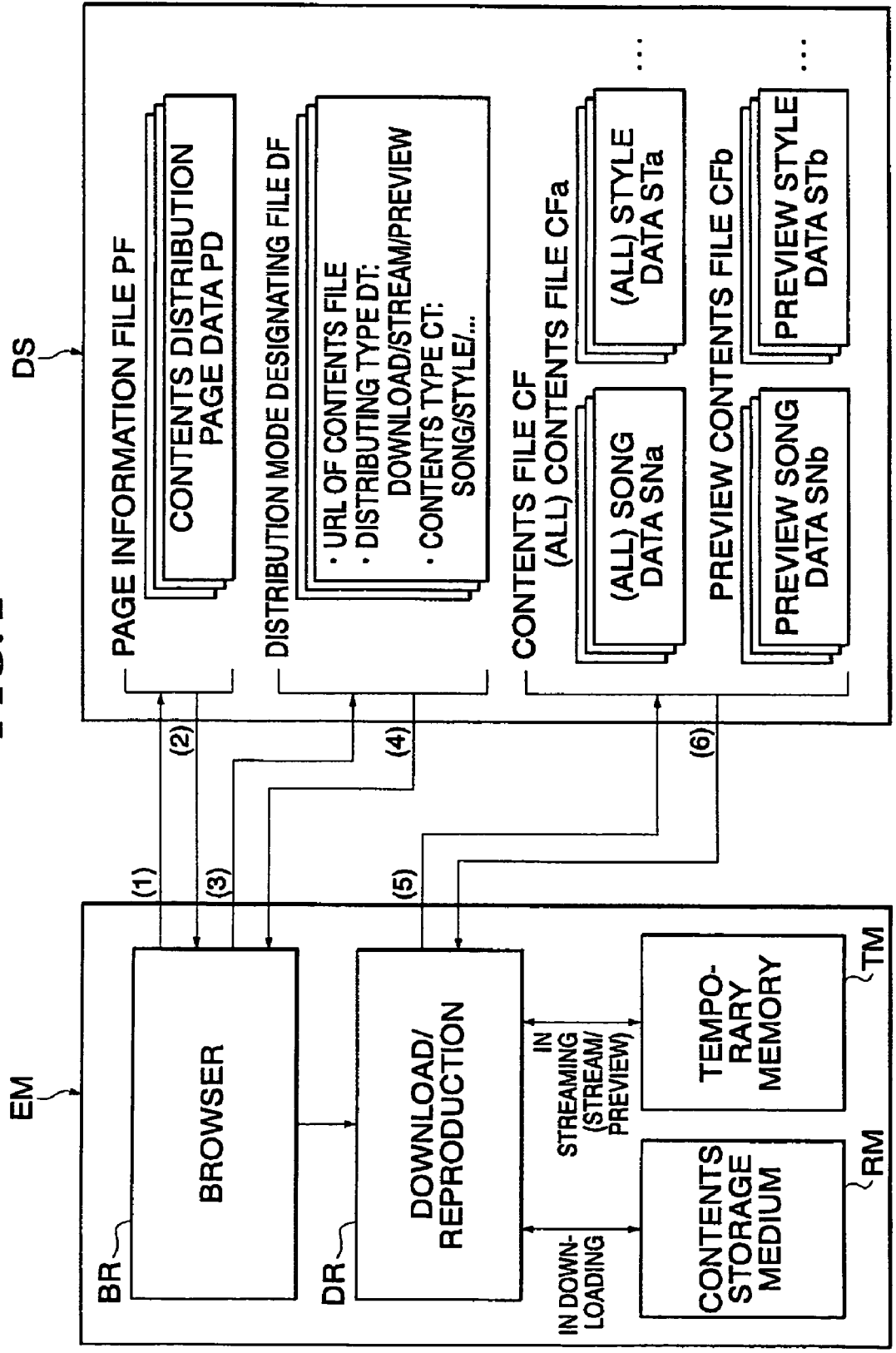
FIG. 2 is a block diagram useful in explaining the overall functions of the contents distribution processing system in FIG. 1.

FIG. 2 is a block diagram useful in explaining the overall functions of the contents distribution processing system in FIG. 1. The overall functions of the contents distribution processing system will now be summarized with reference to FIG. 2. As shown in FIG. 2, in the contents distribution processing system, when the browser processing section BR of the electronic musical apparatus EM as a user terminal accesses the music contents distributing site DS (1) to designate a music contents usage mode (3), the contents distributing site DS returns a distribution mode designating file DF (4). In accordance with the designated music contents usage mode, the file DF indicates whether processing on music contents CF to be distributed is to be performed in a download mode or a streaming mode. The downloading and reproduction processing section DR of the electronic musical apparatus EM is capable of decoding the file DF; the downloading and reproduction processing section DR decodes the file DF, and upon receiving music contents CF from the contents distributing site DS (6) in response to a music contents distributing request (5), the downloading and reproduction processing section DR performs processing on the received music contents CF in the download mode or the streaming mode according to the result of the decoding of the file DF.

The functions of the contents distribution processing system in FIG. 2 will now be described in further detail. In the contents distribution processing system, the CPU 1 of electronic musical apparatus EM as a user terminal operates in accordance with the browser and the downloading and reproducing program included in the music contents processing program, and functions as the browser processing section BR and the downloading and reproduction processing section DR. The browser processing section BR is a functional element which executes the browser to communicate with the contents distributing site DS so as to review information provided by the contents distributing site DS.

The downloading and reproduction processing section DR is an element which executes a helper application referred to as "the downloading and reproducing program" to decode the contents of the distribution mode designating file DF, described below, downloaded as a result of communication with the contents distributing site DS, and performs processing on music contents in the download mode or the streaming mode according to the distribution type (DT) designated in the file DF. Due to the functions of the downloading and reproduction processing section DR, in the download mode, music contents distributed from the contents distributing site DS after downloading of the file DF are stored in the contents recording medium RM, which is arbitrarily selected from among the storage media which implement the external storage device 4, and on the other hand, in the streaming mode, the distributed music contents are temporarily stored in the temporary memory TM reserved in a predetermined storage area of the internal storage medium (or the RAM 2) of the external storage medium 4, and are automatically reproduced.

On the other hand, as shown in FIG. 2, the contents distributing site DS accumulates a large number of contents files CF which can be distributed to the electronic musical apparatuses EM as user terminals, and is provided with a page information file PF and a distribution mode designating file DF. Therefore, the contents distributing site DS can return required data from the corresponding contents file CF according to the result of communication with the electronic musical apparatus EM.

The page information file PF is comprised of plural pieces of contents distribution page data PD intended to provide guidance on contents which are supplied from the contents distributing site DS to the electronic musical apparatuses EM as user terminals.

The distribution mode designating file DF is indicative of the mode of distributing contents, and is sent in advance to the electronic musical apparatus EM when contents are supplied to the electronic musical apparatus EM. Such distribution mode designating files DF are provided in association with the respective contents files CF each of which has contents to be provided. Each distribution mode designating file DF is comprised of a URL (Uniform Resource Locator) indicative of the location of the corresponding contents file CF in the contents distributing site DS, the distribution type DT indicative of the mode in which the corresponding contents file CF is to be distributed to the electronic musical apparatus EM, and the contents type CT indicative of the type of contents.

It should be noted that there are two ways of sending the distribution mode designating file DF as follows: (1) distribution mode designating files DF created in advance are prepared for all the contents files CF, and a file corresponding to a request from a user terminal EM is selected from among the prepared distribution mode designating files DF, and then the selected file is returned to the user terminal EM, and (2) each time there is a request from a user terminal EM, a distribution mode designating file DF corresponding to the request is created and returned to the user terminal EM.

The contents files CF form a file group as the main constituent of a contents database in the contents distributing site DS, and are classified into all-contents files CFa and preview contents files CFb according to the distribution types DT. The all-contents files CFa mainly include music contents for sale to users, and are classified into all-song data files SNa including entire musical composition data, all-style data file STa including entire accompaniment pattern data according to the contents types CT, and so forth.

Similarly, the preview contents files CFb prepared for preview by users are classified into preview song data files SNb, preview style data files STb, and so forth. The preview song data (files) SNb and the preview style data (files) STb are data files obtained by extracting a part of typical or characteristic data from the all-song data (files) SNa and the all-style data (files) STa in the all-contents file CFa, to which the preview song data and the preview style data correspond.

In the following description, the all-contents file (CFa), the all-song data file (SNa), and the all-style data file (STa) will be referred to as "the contents file", "the song data (file)", and "the style data (file)", respectively, insofar as there is no possibility that misunderstandings are produced.

A description will now be given of the distribution types DT of the distribution mode designating file DF. There are three distribution types DT as follows: a download type, a streaming type, and a preview type.

First, the download type is a distribution mode according to which a contents file CFa indicative of all the contents requested by a user is distributed to an electronic musical apparatus EM owned by the user, the electronic musical apparatus EM is instructed to operate in the download mode, and the contents file CFa is permanently stored in the contents recording medium RM (the contents file CFa is never erased insofar as there is no erasing instruction from the user). In this case, according to the contents (song/style/ . . . ) of the contents type DT designated in the distribution mode designating file DF, the contents file CFa is stored in the corresponding storage area among storage areas set in advance in the contents recording medium RM. The contents distributed according to the download type are charged; the contents distributing site DS carries out a charging process in which a terminal user to whom a contents file CFa is distributed is charged at a regular price.

On the other hand, the streaming type and preview type are distribution modes according to which the electronic musical apparatus EM is instructed to operate in the streaming mode, and the contents files CFa and CFb are temporarily stored in the temporary memory TM and/or automatically reproduced. The contents to be distributed according to the streaming type are the same contents files CFa as those distributed according to the download type, but the contents to be distributed according to the preview type are preview contents files CFb containing a typical or characteristic part of contents requested by the user. It should be noted that the contents distributed according to the streaming type are charged, but are charged at a substantially lower price than the price at which contents distributed according to the download type are charged. On the other hand, the contents distributed according to the preview type are usually free of charge.

In the case where processing in the streaming mode is performed according to the streaming or preview type, the electronic musical apparatus EM can provide automatic performance according to the contents files CFa or CFb which are temporarily stored in the temporary memory TM, but it is configured such that the contents stored in the temporary memory TM are forced to be erased at the earlier one of a time point power supply of the electronic musical apparatus EM is turned off and a time point a predetermined period of time (e.g. 72 hours) has elapsed.

Therefore, in the present system, as indicated by arrows between the electronic musical apparatus EM and the contents distributing site DS in FIG. 2, (1) when the browser processing section BR of the electronic musical apparatus EM accesses the music contents distributing site DS in response to an operation performed by the user, (2) the contents distributing site DS returns the corresponding page data PD to the browser processing section BR. As a result, the electronic musical apparatus EM displays a page screen on the display 16 according to the returned page data PD, and the user reviews the page screen and selects desired music contents, so that the distributing site DS is instructed to distribute the music contents required by the user.

In the selection of contents, contents lists of the titles and/or numbers of contents are arranged according to the types of contents such as "song" and "style" (song title or a song number in the case of a song, and a style name or a style number in the case of a style), and usage mode selecting buttons (including character strings) named as "purchase", "stream", and "preview" are displayed on a page screen of the display 16 so that they can be selectively operated. The user selects and designates the title or number of desired contents from a contents list of a desired type, and designates the usage mode of the contents by checking off a desired usage mode selecting button, and in response to this, (3) the browser processing section BR of the electronic musical apparatus EM accesses the contents distributing site DS according to the contents type, contents title or number, and usage mode designated by the user to instruct an operation according to the designations.

The contents distributing site DS identifies a contents file CF corresponding to the above instruction given by access of the electronic musical apparatus EM and determines the URL of the contents file CF, and determines the contents type CT and the distribution type DT according to the designated contents type and usage mode. For example, if the usage mode is "purchase", the contents distributing site DS determines that the distribution type DT is the download type, and if the usage mode is "stream" or "preview", the contents distributing site DS determines that the distribution type DT is the "streaming" or "preview" type, respectively. Then, (4) the contents distributing site DS creates a distribution mode designating file DF which is comprised of URL, distribution type DT, and contents type CT determined in the above mentioned manner, or acquires a distribution mode designating file DF which stores the same contents in advance, and returns the created or acquired distribution mode designating file DF to the browser processing section BR of the electronic musical apparatus EM.

The browser processing section BR of the electronic musical apparatus EM downloads the distribution mode designating file DF returned from the contents distributing site DS, and sends the distribution mode designating file DF to the downloading and reproduction processing section DR. Then, (5) the downloading and reproducing processing section DR decodes the distribution mode designating file DF sent from the browser processing section BR and accesses the URL indicated by the distribution mode designating file DF, and requests distribution of the desired contents file CF located at the URL. In response to the request, (6) the contents distributing site, DS sends the contents file CF located at the URL to the downloading and reproduction processing section DR of the electronic musical apparatus EM.

The downloading and reproduction processing section DR of the electronic musical apparatus EM performs processing on the contents file CF sent from the contents distributing site DS, according to the distribution type DT indicated by the distribution mode designating file DF. Specifically, if the distribution type DT is the download type, processing is performed in the download mode, and the contents file CFa which has been sent is stored in the contents recording medium RM. Thereafter, the user of the electronic musical apparatus EM can freely use the contents file CFa stored in the contents recording medium RM.

If the distribution type DT is the streaming type or the preview type, processing is performed in the streaming mode. In this case, the contents file CFa or the preview contents file CFb which has been sent is temporarily stored in the temporary memory TM and automatically reproduced (this is so-called streaming-reproduction). While the contents file CFa or CFb is stored in the temporary memory TM, it is possible to carry out automatic performance as needed by reproducing the contents file CFa or CFb. The contents file CFa or CFb, however, is erased from the temporary memory TM when power supply of the electronic musical apparatus EM is turned off, or even if power supply of the electronic musical apparatus EM is not turned off, the contents file CFa or CFb is automatically erased when a predetermined period of time has elapsed since it is stored in the temporary memory TM.

Figure 3:
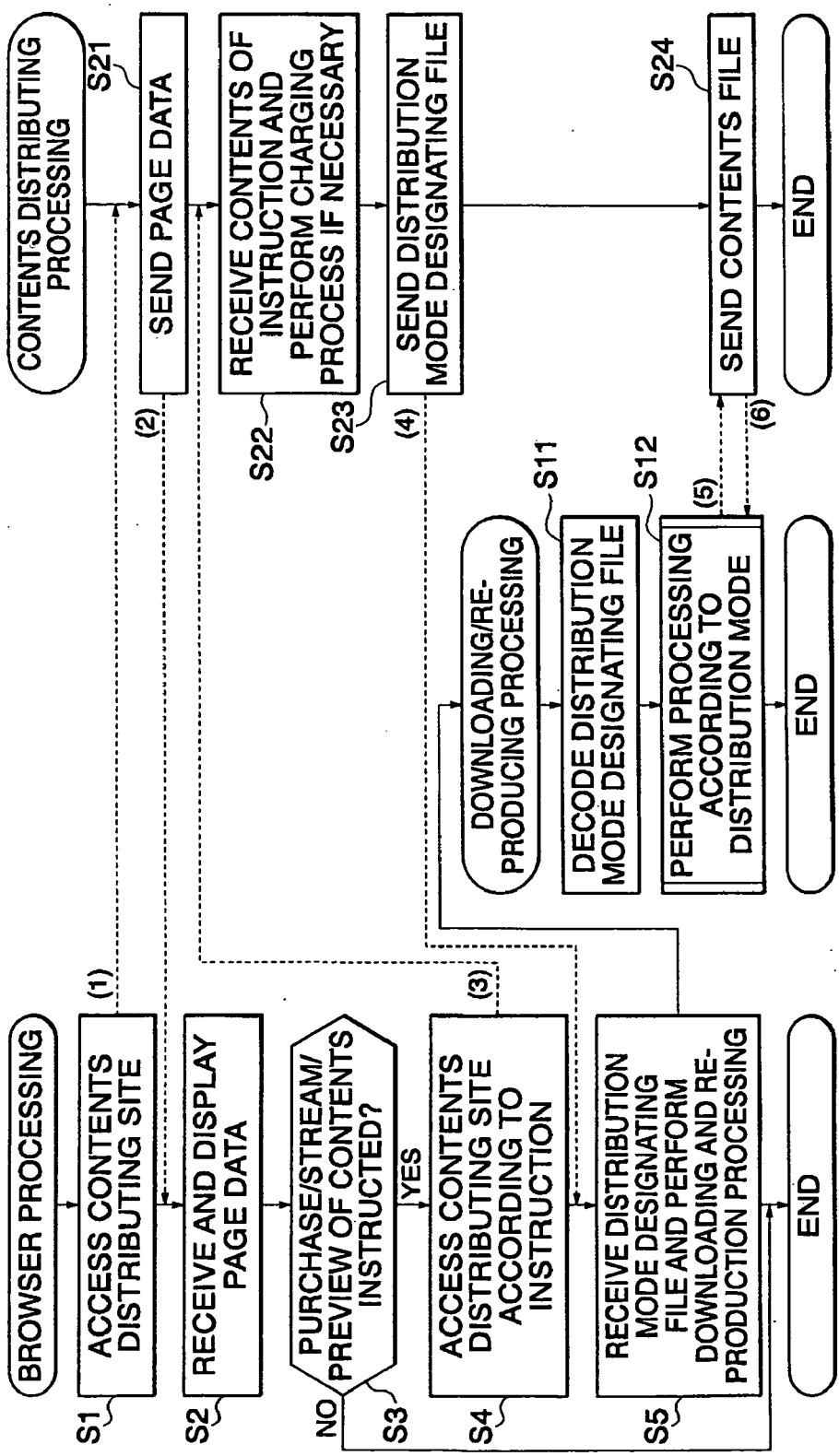
FIG. 3 is a flow chart showing an example of the overall operation of the contents distribution processing system.
Figure 4A:
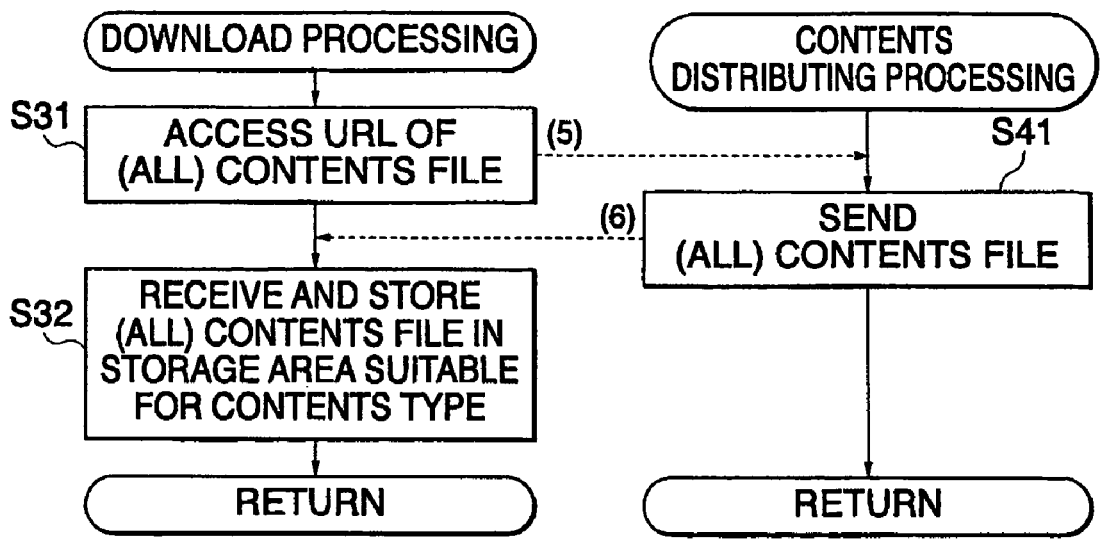
FIGS. 4A to 4C are flow charts showing examples of processing performed by the contents distribution processing system according to respective different distribution types.
Figure 4B:
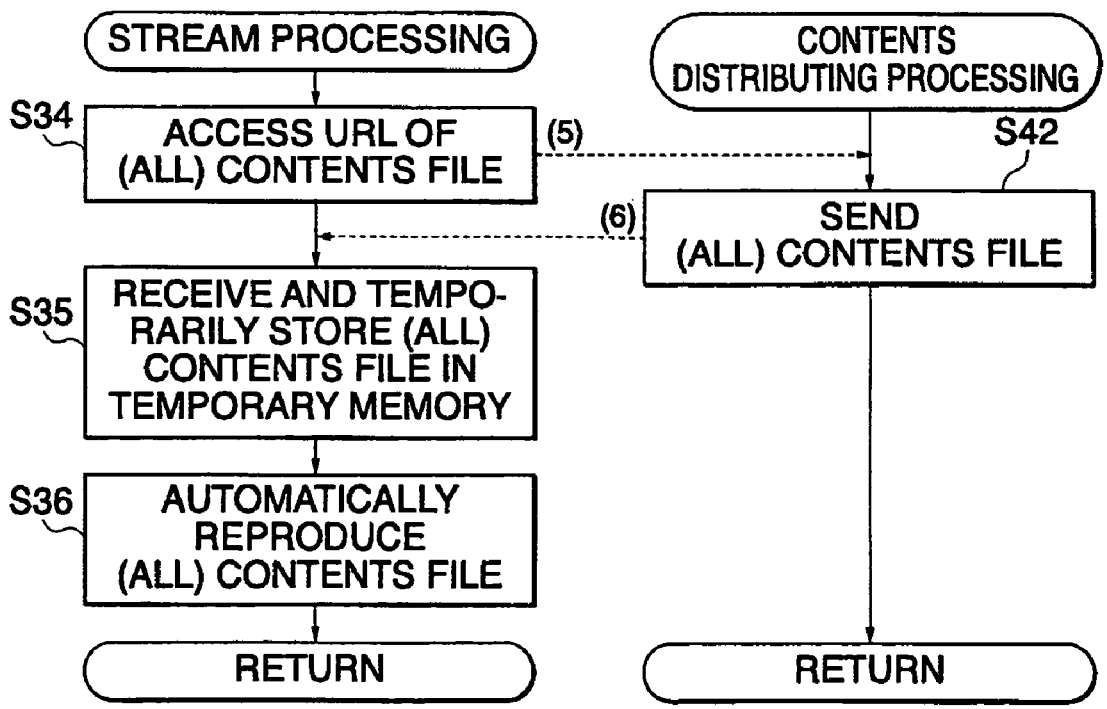
Figure 4C:
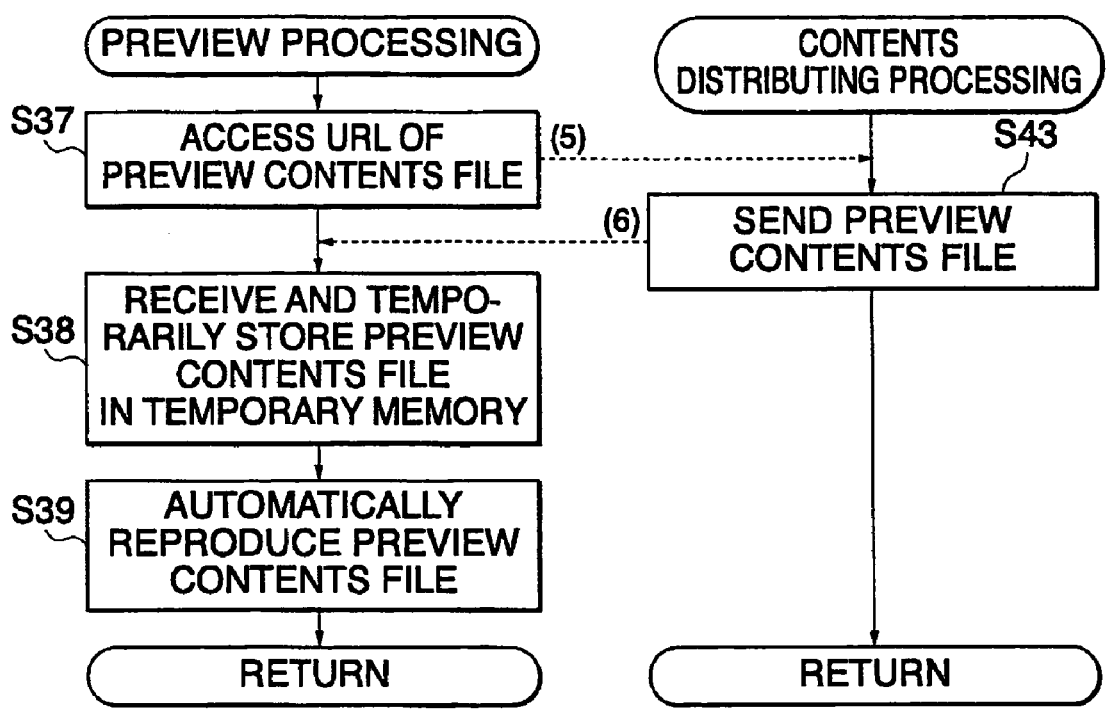

FIG. 3 is a flow chart showing an example of the overall operation of the contents distribution processing system. FIGS. 4A to 4C are flow charts showing examples of processing performed by the contents distribution processing system according to respective different distribution types. It should be noted that in FIGS. 3 and 4A to 4C, broken arrows and symbols "(1)" to "(6)" useful in explaining communications between the electronic musical apparatus (user terminal) EM and the music contents distributing site DS correspond to the arrows and symbols "(1)"to "(6)" in FIG. 2.

First, a description will be given of the overall operation of the contents distribution processing system in FIG. 3. In the electronic musical apparatus EM, the browser processing section BR starts browser processing in response to an operation of a predetermined setting operator 15 by the user, and then the electronic musical apparatus EM accesses the contents distributing site DS (step S1) (see the arrow (1)).

On the other hand, the contents distributing site DS sends contents distribution page data PD in a page information file PF to the electronic musical apparatus EM (step S21) (see the arrow (2)). The browser processing section BR of the electronic musical apparatus EM receives the contents distribution page data PD and displays on the display 16 a guidance screen based on the contents distribution page data PD (step S2).

On the guidance screen, contents which can be provided by the contents distributing site DS and contents distribution types are displayed so that desired ones can be selected. For example, contents lists, which are arranged according to various contents types such as "song" and "style", are displayed, and a desired type of contents can be selected from each contents list. Also, usage mode selecting buttons are displayed on the guidance screen so that usage modes such as purchase, streaming, and preview can be selected for the selected contents. Therefore, when the user selects the title or number of desired contents (e.g. a song title or a song number/a style name or a style number) from a contents list of a desired type (e.g. song/style/ . . . ) and selects the usage mode (e.g. purchase, streaming, or preview) of the selected contents by operating any usage mode selecting button, the desired contents and the usage mode thereof are notified to the contents distributing site DS.

Then, the browser processing section BR determines whether any contents usage mode has been designated or not (step S3). If no usage mode has been designated, the browser processing is immediately terminated. On the other hand, if any usage mode such as downloading, streaming, or preview has been designated, the browser processing section BR accesses the contents distributing site DS according to the designation, and requests the contents distributing site DS to distribute the desired contents in the desired usage mode (step S4) (see the arrow (3)).

The contents distributing site DS which has received the request carries out a charging process according to the contents of the request if necessary (i.e. if downloading or streaming has been instructed) (step S22), and then sends a distribution mode designating file DF corresponding to the request to the electronic musical apparatus EM (step S23) (see the arrow (4)).

The browser processing section BR of the electronic musical apparatus BR receives and download the distribution mode designating file DF, then sends the same to the downloading and reproduction processing section DR, causes the downloading and reproduction processing section DR to perform subsequent processing (step S5), and terminates the browser processing.

On the other hand, the downloading and reproduction processing section DR decodes the downloaded distribution mode designating file DF and determines the distribution type DT thereof (step S11), and performs processing in the download mode or the streaming mode according to the determined distribution type DT (step S12). Specifically, the downloading and reproduction processing section DR accesses the URL designated in the distribution mode designating file DF (see the arrow (5)), and when a contents file CF located at the accessed URL is sent from the contents distributing site DS (step S24) (see the arrow (6)), the downloading and reproduction processing section DR performs processing on the contents file CF in the download mode or the streaming mode according to the distribution type DT designated in the downloaded distribution mode designating file DF, and then stores or reproduces the same.

FIGS. 4A to 4C are flow charts showing concrete examples of contents processing performed according to the above-mentioned distribution types. If the distribution type DT is the download type, as shown in FIG. 4A, when the downloading and reproduction processing section DR of the electronic musical apparatus EM accesses the URL of the contents file CFa in the contents distributing site DS (step S31) (see the arrow (5)), the contents distributing site DS sends the contents file CFa located at the accessed URL (step S41) (see the arrow (6)).

Upon receiving the contents file CFa, the downloading and reproduction processing section DR performs processing in the download mode because the distribution type DT designated in the distribution mode designating file DF is the download type, and then the downloading and reproduction processing section DR stores the contents file CFa in a predetermined storage area of the contents recording medium RM, i.e. a storage area corresponding to the contents type CT (e.g. song/style/ . . . ) (step S32).

On the other hand, if the distribution type DT is the streaming type, as shown in FIG. 4B, when the downloading and reproduction processing section DR of the electronic musical apparatus EM accesses the URL of the contents file CFa in the contents distributing site DS (step S34) (see the arrow (5)), the contents distributing site DS sends the contents file CFa located at the accessed URL (step S42) (see the arrow (6)). Upon receiving the contents file CFa, the downloading and reproduction processing section DR performs processing in the streaming mode because the distribution type DT designated in the distribution mode designating file DF is the streaming type.

Specifically, the contents file CFa sent from the contents distributing site DS is temporarily stored in the temporary memory TM (step S35), and is automatically reproduced to output musical tones corresponding to the contents file CFa via the musical tone output section 8, 9, and 17 (step S36). The contents file CFa stored in the temporary memory TM is erased when power supply of the electronic musical apparatus EM is turned off, or even if power supply of the electronic musical apparatus EM is not turned off, the contents file CFa stored in the temporary memory TM is forced to be erased when a predetermined period of time has elapsed.

If the distribution type DT is the preview type, as shown in FIG. 4C, when the downloading and reproduction processing section DR of the electronic musical apparatus EM accesses the URL of the preview contents file CFb in the contents distributing site DS (step S37) (see the arrow (5)), the contents distributing site DS sends the contents file CFa located at the accessed URL (step S43) (see the arrow (6)). Upon receiving the preview contents file CFb, the downloading and reproduction processing section DR performs processing in the streaming mode to store the preview contents file CFb in the temporary memory TM, temporarily (step S38) and automatically reproduce the same (step S39) because the distribution type DT designated in the distribution mode designating file DF is the preview type. In this case. as well, the preview contents file CFb stored in the temporary memory TM is forced to be erased at the earlier one of a time point power supply of the electronic musical apparatus EM is tuned off and a time point a predetermined period of time has elapsed.

It should be understood that the present invention is not limited to the embodiment described above, but various changes in or to the above described embodiment may be possible without departing from the spirits of the present invention, including changes as described below. For example, music contents should not be comprised of only music data, but may be comprised of image data, musical score data, etc. as well as music data.

Further, in the present embodiment, the all-contents files (CFa) and the preview contents files (CFb) are provided as the contents files (CF) in the contents distributing site DS, but a part or all of the preview contents file (CFb) may be omitted, and when any preview contents are requested, a preview contents file may be created by extracting necessary data from the all-contents files (CFa) corresponding to the request, or alternatively, a preview contents file may be created by providing the corresponding all-contents files (CFa) with limitation information indicative of a limitation imposed on reproduction so that only a part of the all-contents files (CFa) can be reproduced.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. An electronic musical apparatus comprising:
a page data receiving device that receives music contents distribution page data including a list of music contents providable to the electronic musical apparatus and types of designatable usage modes;
a usage mode instruction sending device that instructs a music contents distributing site to provide designated music contents and a designated usage mode;
a distribution mode receiving device that receives a distribution mode designating file indicative of whether the designated music contents are to be distributed from the music contents distributing site in a download mode or a streaming mode;
a distribution mode interpreting device that interprets the received distribution mode designating file;
a contents receiving device that receives the designated music contents from the music contents distributing site; and
a contents processing device that performs processing on the received designated music contents in the download mode or the streaming mode according to a result of the interpretation by said distribution mode interpreting device,
wherein both the music contents distribution page data and the distribution mode designating file are separate from the designated music contents to be received, and are received in advance of the designated music contents to be received, and
wherein the distribution mode designating file includes a Uniform Resource Locator (URL) indicative of a location of the corresponding music contents in the music contents distributing site, and a distribution type indicative of the mode in which the corresponding music contents is to be distributed to the electronic musical apparatus.

2. An electronic musical apparatus according to claim 1, further comprising a storage device comprising at least a first storage medium and a second storage medium, and
wherein in the download mode, said contents processing device permanently stores the designated music contents received by said contents receiving device in said first storage medium, and in the streaming mode, said contents processing device temporarily stores the designated music contents received by said contents receiving device in said second storage medium and automatically starts reproducing the stored music contents.

3. An electronic musical apparatus according to claim 2, wherein:
the music contents comprise a plurality of contents including at least download contents and preview contents, each including a plurality of types of data including at least song data and style data; and
said contents receiving device receives the download contents in the download mode, and receives the preview contents in the streaming mode.

4. An electronic musical apparatus according to claim 3, wherein said first storage medium comprises a plurality of storage areas, and said contents processing device stores the download contents in respective ones of the storage areas corresponding to the types of the download contents.

5. An electronic musical apparatus according to claim 2, wherein in the download mode, said contents processing device temporarily stores the designated music contents received by said contents receiving device in said first storage medium, but never automatically reproduces the music contents stored in said first storage medium.

6. A music contents distributing site comprising:
a page data sending device that sends to a user terminal music contents distribution page data including a list of music contents and types of usage modes that are designatable;
a usage instruction receiving device that receives an instruction indicative of a music contents usage mode from the user terminal;
a distribution mode sending device that sends a distribution mode designating file indicative of whether processing on music contents to be distributed is to be performed in a download mode or a streaming mode to the user terminal according to contents of the received instruction; and
a contents sending device that sends the music contents to the user terminal according to a request to distribute the music contents received from the user terminal,
wherein both the music contents distribution page data and the distribution mode designating file are separate from the music contents to be sent, and are sent in advance of the music contents to be sent, and
wherein the distribution mode designating file includes a Uniform Resource Locator (URL) indicative of a location of the corresponding music contents in the music contents distributing site, and a distribution type indicative of the mode in which the corresponding music contents is to be distributed to the user terminal.

7. A music contents distributing site according to claim 6, further comprising a charging device that carries out a charging process according to the instruction indicative of the music contents usage mode received by said usage instruction receiving device, and
wherein said distribution mode sending device sends the distribution mode designating file after the charging process is carried out by said charging device.

8. A music contents distributing site according to claim 7, wherein:
the music contents comprise a plurality of contents including at least download contents and preview contents, each including a plurality of types of data including at least song data and style data; and
when the distribution mode designating file designates processing in the download mode, said contents sending device sends the download contents via the download mode, and when the distribution mode designating file designates processing in the streaming mode, said contents sending device sends one of the download contents or the preview contents via the streaming mode.

9. A music contents processing method comprising:
a page data receiving step of receiving music contents distribution page data including a list of music contents providable to an electronic musical instrument and types of designatable usage modes;
a usage mode instruction sending step of instructing a music contents distributing site to provide designated music contents and a designated usage mode;
a distribution mode receiving step of receiving a distribution mode designating file indicative of whether the designated music contents are to be distributed from the music contents distributing site in a download mode or a streaming mode;
a distribution mode interpreting step of interpreting the received distribution mode designating file;
a contents receiving step of receiving the designated music contents from the music contents distributing site; and
a contents processing step of performing processing on the received designated music contents in the download mode or the streaming mode according to a result of the interpretation in said distribution mode interpreting step, wherein both the music contents distribution page data and the distribution mode designating file are separate from the designated music contents to be received, and are received in advance of the designated music contents to be received, and wherein the distribution mode designating file includes a Uniform Resource Locator (URL) indicative of a location of the corresponding music contents in the music contents distributing site, and a distribution type indicative of the mode in which the corresponding music contents is to be distributed to the electronic musical instrument.

10. A music contents distributing method comprising:

a page data sending step of sending to a user terminal music contents distribution page data including a list of music contents providable to the user terminal and types of usage modes that are designatable;

a usage instruction receiving step of receiving an instruction indicative of a music contents usage mode from the user terminal;

a distribution mode sending step of sending a distribution mode designating file indicative of whether processing on music contents to be distributed is to be performed in a download mode or a streaming mode to the user terminal according to contents of the received instruction; and a contents sending step of sending the music contents to the user terminal according to a request to distribute the music contents received from the user terminal, wherein both the music contents distribution page data and the distribution mode designating file are separate from the music contents to be sent, and are sent in advance of the music contents to be sent, and wherein the distribution mode designating file includes a Uniform Resource Locator (URL) indicative of a location of the corresponding music contents in the music contents distributing site, and a distribution type indicative of the mode in which the corresponding music contents is to be distributed to the user terminal.

11. A computer-readable medium storing a computer program for distributing music contents, the computer program comprising:

a page data receiving module for receiving music contents distribution page data including a list of music contents providable to an electronic musical instrument and types of designatable usage modes;

a usage mode instruction sending module for instructing a music contents distributing site to provide designated music contents and a designated usage mode;

a distribution mode receiving module for receiving a distribution mode designating file indicative of whether the designated music contents are to be distributed from the music contents distributing site in a download mode or a streaming mode;

a distribution mode interpreting module for interpreting the received distribution mode designating file;

a contents receiving module for receiving the designated music contents from the music contents distributing site; and a contents processing module for performing processing on the received designated music contents in the download mode or the streaming mode according to a result of the interpretation by said distribution mode interpreting module, wherein both the music contents distribution page data and the distribution mode designating file are separate file from the designated music contents to be received, and are received in advance of the designated music contents to be received, and wherein the distribution mode designating file includes a Uniform Resource Locator (URL) indicative of a location of the corresponding music contents in the music contents distributing site, and a distribution type indicative of the mode in which the corresponding music contents is to be distributed to the electronic musical instrument.

12. A computer-readable medium storing a computer program for processing music, the computer program comprising:

a page data sending module for sending to a user terminal music contents distribution page data including a list of music contents providable to the user terminal and types of designatable usage modes;

a usage instruction receiving module for receiving an instruction indicative of a music contents usage mode from the user terminal;

a distribution mode sending module for sending a distribution mode designating file indicative of whether music contents to be distributed are to be processed in a download mode or a streaming mode to the user terminal according to contents of the received instruction; and a contents sending module for sending the music contents to the user terminal according to a request to distribute the music contents received from the user terminal, wherein both the music contents distribution page data and the distribution mode designating file are separate from the music contents to be sent, and are sent in advance of the music contents to be sent, and wherein the distribution mode designating file includes a Uniform Resource Locator (URL) indicative of a location of the corresponding music contents in the music contents distributing site, and a distribution type indicative of the mode in which the corresponding music contents is to be distributed to the user terminal.

* * * * *